United States Patent [19]

Gassmann et al.

[11] Patent Number: 4,917,407
[45] Date of Patent: Apr. 17, 1990

[54] PLASTIC PART PROVIDED WITH A METAL THREADED ELEMENT

[76] Inventors: Heiner Gassmann, Jakobstr. 3, 7300 Esslingen 1; Siegfried Beck, Stöfflerweg 8, 7000 Stuttgart 80; Werner Heinlein, Arnaudweg 7, 7135 Wiernsheim 2, all of Fed. Rep. of Germany

[21] Appl. No.: 97,008

[22] Filed: Sep. 16, 1987

Related U.S. Application Data

[60] Division of Ser. No. 852,385, Apr. 15, 1986, Pat. No. 4,714,278, which is a continuation of Ser. No. 170,225, Jul. 18, 1980, abandoned.

[30] Foreign Application Priority Data

Sep. 15, 1979 [DE] Fed. Rep. of Germany ....... 2937443

[51] Int. Cl.$^4$ .............................................. F16L 55/00
[52] U.S. Cl. .................................... 285/169; 285/347
[58] Field of Search ............... 285/382, 331, 239, 238, 285/256, 347, 169; 251/148

[56] References Cited

U.S. PATENT DOCUMENTS

| | | | |
|---|---|---|---|
| 1,936,669 | 11/1933 | Heeter | 285/382 X |
| 2,453,997 | 11/1948 | MacWilliam | 285/256 |
| 2,461,414 | 2/1949 | Donner | 285/238 X |
| 2,498,395 | 2/1950 | Coss | 285/382 X |
| 2,570,406 | 10/1951 | Troshkin et al. | 285/331 X |
| 2,751,767 | 6/1956 | Hedden | 285/382 X |
| 2,776,151 | 1/1957 | Harkenrider | 285/238 X |
| 3,396,848 | 8/1968 | Kozel | 251/148 X |
| 3,455,579 | 7/1969 | Olliff, Jr. et al. | 285/331 X |
| 3,578,360 | 5/1971 | Eliot | 285/256 X |
| 4,026,581 | 5/1977 | Pasbrig | 285/331 X |
| 4,093,280 | 6/1978 | Yoshizawa et al. | 285/238 |
| 4,103,941 | 8/1978 | Stoll | 285/382 X |
| 4,220,358 | 9/1980 | Gaffney | 285/331 X |

FOREIGN PATENT DOCUMENTS

| | | | |
|---|---|---|---|
| 285399 | 7/1965 | Australia | 285/382 |
| 2120175 | 11/1972 | Fed. Rep. of Germany . | |
| 2831832 | 2/1979 | Fed. Rep. of Germany | 285/382 |

*Primary Examiner*—Thomas F. Callaghan
*Attorney, Agent, or Firm*—Edwin E. Greigg

[57] ABSTRACT

A plastic housing cover for a valve having an integral connector nozzle part provided with a metal threaded nipple element is proposed, in which it is assured that the threaded element, inserted in a sealing manner into the plastic, cannot destroy the tight connection with the plastic part during the twisting of insertion and possible twisting on the part of the threaded element itself. The threaded element is accordingly given an opportunity at the outset to rotate, while maintaining the tightness of the seal. The threaded nipple element is preferably a hollow threaded connector and the plastic part comprises a cover of a compressed air valve, especially a brake valve.

12 Claims, 1 Drawing Sheet

PLASTIC PART PROVIDED WITH A METAL THREADED ELEMENT

This application is a division of application Ser. No. 852,385 filed Apr. 15, 1986, now U.S. Pat. No. 4,714,278, which is a file wrapper continuation of application Ser. No. 170,225 filed July 18, 1980, now abandoned.

BACKGROUND OF THE INVENTION

The invention relates to a plastic part as described herein. A plastic part of this kind is known (German Offenlagungsschrift 21 20 175). In this known realization, the metal threaded element has protrusions which have the plastic of the plastic part cast or sprayed over them circumferentially. In this manner, a tight connection is created which is resistent to conventional stresses in terms of stability. However, if for any reason, such as a soiled or damaged thread, the stress during twisting is too great, then the connection is excessively stretched or the threads are stripped. The connection is no longer tight and the plastic part is destroyed. During assembly, the stripping of the thread may go unnoticed; if the plastic part is a cover for a brake valve, for instance, the leakage thus arising can cause severe problems in the brake system.

OBJECT AND SUMMARY OF THE INVENTION

The plastic part has the advantage over the prior art that a connection which resists the stresses involved in insertion and resists destruction at least during operation is provided. The use of a sealing ring assures tightness even in the event that the threaded part also rotates as a result of excessive stress. The service life of the connection is thus lengthened.

It is also advantageous that the threaded part is from the outset given the opportunity to rotate while still assuring tightness in terms of the seal.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
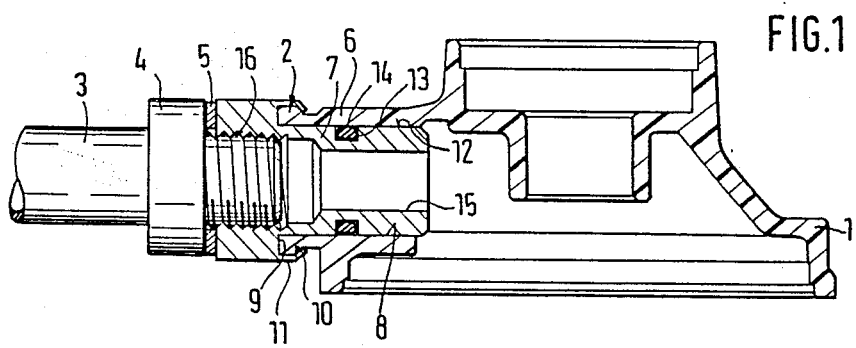
FIG. 1 shows in cross-section, a plastic part acting as the cover of a brake valve with a metal connector having an internal thread.

A housing cover 1 of a trailer-control valve (not shown in further detail) has a connector 2 for securing a compressed air line 3 by means of a threaded nipple 4 and an annular disc seal 5.

The housing cover 1 is made of plastic, and the connector 2 is formed first by a sleeve 6 cast together with the housing cover 1 and second by a metal threaded insert element 7. The sleeve 6 has a bore 8 as a cylindrical receiver, which represents a holding or insertion area for the metal threaded element 7.

The threaded insert element 7, for the purpose of fixing it axially within the receiver 8, has two shoulders 9 and 10, one (9) of which is produced before assembly and the other (10) of which is produced during assembly, by means of flanging, rolling, or the like. The shoulder 10 is located at the end of an axial protrusion 11 of the threaded insert element 7. The metal threaded insert element 7 is also provided, on its jacket face 12 located in the receiver bore 8, with an annular groove 13, into which an 0-ring 14 is inserted as a seal. The threaded insert element 7 has an axial through bore 15, into which a thread 16 is inserted on the outer end in order to receive the nipple 4.

When the nipple 4 is threaded into the thread 16, then the flanged or rolled shoulder 10 holds the threaded insert element 7 in the receiver 8 so firmly that the threaded insert element 7 does not itself rotate. However, if the torque is so high——because of a soiled or damaged thread 16, for instance——that the shoulder 10 can no longer hold the threaded insert element 7, then the threaded insert element 7 does rotate. The threaded element can also become loosened as a result of some other excess stress, such as that caused by severe rattling of the housing cover 1.

Then, however, the ring seal 14 serves to assure that the connection does not lose its tightness. Also, the plastic cover is accordingly not damaged. Thus the service life of the connection and that of the housing cover 1 are lengthened.

Figure 2:
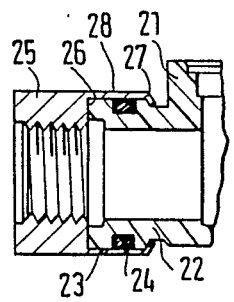
FIG. 2 shows in cross-section, a detail of a different realization of the invention.

FIG. 2 shows a plastic part 21 with a cylindrical receiver 23 located on the sleeve 22 and embodied as an outer face. A ring seal 24 is inserted into this outer face, and a metal threaded insert element 25 is pushed onto the outer face. The receiver 23 has a predetermined length, and the threaded insert element 25 has two shoulders 26 and 27 to fix it axially, one of which (26) is produced before assembly and the other of which (27) is produced during assembly by flanging or rolling. The threaded insert element 25 has an axial protrusion 28, on the end of which the shoulder 27 is disposed.

Figure 3:
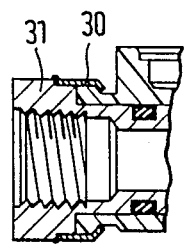
FIG. 3 shows in cross-section, a further variant.

FIG. 3 shows a structure similar to that of FIG. 1, but in which an axial protrusion 30 of a threaded insert element 31 is formed by a rolled metal sheet or a piece of pipe, which is welded or soldered to the rest of the threaded insert element 31.

Figure 4:
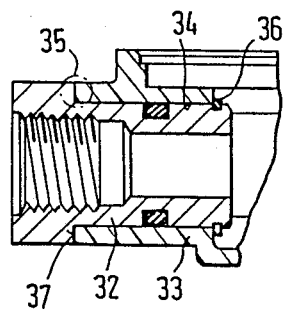
FIG. 4 shows in cross-section, a connection which can be released without being destroyed.
Figure 5:
FIG. 5 shows a detail of FIG. 4 in cross-section.

In FIG. 4, a connection between a metal threaded element 32 and a plastic part 33 is shown which is releasable without being destroyed. The threaded element 32, in order to be fixed axially in a receiver 34, has two shoulders 35 and 36, of which one shoulder 35 is formed before assembly and the other shoulder 36 is formed during assembly. The shoulder 36 formed during assembly is a snap ring. As shown in FIG. 5, a plane surface 37 opposite the shoulder 35 is provided with an annular bulge 38, so that the initial axial tension necessary for maintaining the seal is provided.

Figure 6:
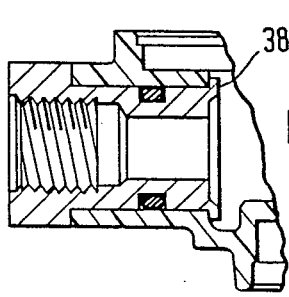
FIG. 6 shows in cross-sectional view, a detail of a further variant.

A similar structure is shown in FIG. 6. Here, the only substitution is that of a flange 38 for the snap ring shoulder 36.

Figure 7:
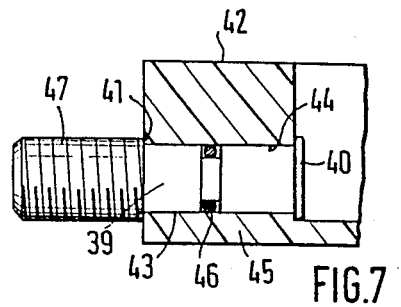
FIG. 7 shows in cross-section, a connector having an external thread.

FIG. 7 shows that, instead of a threaded insert element having an internal thread (that is, a threaded sleeve), it is also possible to use a threaded element 39 with an external thread (that is, a threaded bolt). A threaded element 39 of this kind is inserted into a receiver 44 of a housing wall 45 of the plastic part 42 and fixed between a shoulder 41 and a shoulder 40, formed by means of flanging or the like during assembly, on the plastic element 42. The threaded element 39 can be used for the purpose of securing any arbitrary structural component to the plastic part 42. Here, as well, a ring seal 46 inserted into the jacket face 43 of the threaded element 39 serves to assure reliable sealing, even when excessive forces engage the threaded element 39.

In the embodiments as shown in FIGS. 2, 3, 4, 6 and 7, as well, the shoulder 27, 38, 40 produced by flanging or rolling or represented by the snap ring 36 holds the threaded element 25, 31, 32, 39 in or on its receiver 23, 34, 44 so firmly that the threaded element does not itself rotate during the insertion process. However, should the torque become so high, for instance because of a soiled or damaged thread, that the shoulder 27, 36, 38, 40 can no longer hold the threaded element 25, 31, 32, 39, then the threaded element does rotate. Other excessive stresses are also conceivable, such as rattling or sudden impacts, which would cause the threaded element 25, 31, 32, 39 to lose its firm connection in its receiver 23, 34, 44.

In all cases, however, the ring seal 14, 24, 46 serves to assure that the connection does not lose its tightness in terms of sealing. Thus the service life of the connection is increased and the receiver 23, 34, 44 and the plastic part 21, 33, 42 are not destroyed.

The foregoing relates to preferred exemplary embodiments of the invention, it being understood that other embodiments and variants thereof are possible within the spirit and scope of the invention, the latter being defined by the appended claims.

What is claimed and desired to be secured by letters patent of the U.S. is:

1. A plastic housing cover for a valve, said cover including an open upper end and an open base of larger diameter than said upper end which open base set as upon said valve to cover said valve, said cover further including an integral cylindrical connector sleeve formed as a unitary part of said cover extending outwardly therefrom and including a cylindrical bore therein, said connector sleeve having a connector end with a radially extending shoulder, said connector sleeve further includes an annular channel, a seal means in said annular channel exterior surface of said connector sleeve, a metal nipple having a passage therethrough with threads on an inner surface of one end of said passage, said passage in said metal nipple being substantially the same diameter as said cylindrical bore in said connector sleeve, said metal nipple having a first nonthreaded outer cylindrical end portion radially outwardly of said threaded end of said passage, said first nonthreaded outer cylindrical end portion having a diameter which is greater than the diameter of said radially extending shoulder of said connector end of said connector sleeve, said metal nipple including an outer connector means having an outer diameter greater than said connector sleeve which covers an exterior surface of said connector sleeve and said seal means for securing said metal nipple to said connector sleeve and for connecting a fluid pressure line connected to said threaded end of said nipple to said connector end of said connector sleeve.

2. A plastic housing cover for a valve as defined by claim 1, further wherein said outer connector means on said threaded metal nipple is an integral axial protrusion arranged to firmly grasp said connector sleeve.

3. A plastic housing cover for a valve as defined by claim 2, further wherein said threaded metal nipple has a predetermined length and plural spaced shoulder means at least one of said shoulder means being formed by rolling or flanging thereof.

4. A plastic housing cover for a valve as defined by claim 2, further wherein said outer connector means on said threaded metal nipple which is arranged to firmly grasp said connector sleeve is a separate member that is secured to said metal nipple by welding or soldering.

5. A plastic housing cover for a valve as defined by claim 4, further wherein said separate member that is secured to said nipple by welding or soldering further comprises a cylindrical rolled metal sheet.

6. A plastic housing cover for a valve, said cover including an open upper end and an open base of larger diameter than said upper end which open base seats upon said valve to cover said valve, said cover further including an integral connector sleeve formed as a unitary part of said cover extending outwardly therefrom and including a cylindrical bore therein, a metal nipple having a passage therethrough with threads on an inner surface of one end of said passage, said metal nipple having a first nonthreaded outer cylindrical end portion radially outwardly of said threaded end of said passage, said first nonthreaded outer cylindrical end portion having a diameter which is substantially the diameter of said connector end of said connector sleeve, said metal nipple including a second cylindrical end portion having an outer diameter smaller than said first cylindrical end portion and substantially the same diameter as said bore of said connector sleeve for securing said second cylindrical end portion of said nipple in said bore of said connector sleeve and for connecting a fluid pressure line connected to said threaded end of said nipple to said connector end of said connector sleeve, further wherein said connector sleeve is cylindrical and arranged to receive said second end portion of said threaded metal nipple in a sealing fashion, and a seal means between said second end portion of said threaded metal nipple and said cylindrical bore in said connector sleeve for assuring a seal therebetween.

7. A plastic housing cover for a valve as defined by claim 6, further wherein said threaded nipple has a predetermined length and plural spaced shoulder means, and said connector sleeve is provided with an annular bulged area that abuts a portion of said threaded metal nipple.

8. A plastic housing cover for a valve as defined by claim 6, further wherein said second cylindrical end portion further includes an annular channel, and a seal means in said annular channel.

9. A plastic housing cover for a valve as defined by claim 8, which includes means that overlap an outer portion of said connector sleeve and said metal nipple for securing said metal nipple to said connector sleeve.

10. A plastic housing cover for a valve as defined by claim 8, further wherein said threaded metal nipple has a predetermined length and plural spaced shoulder means.

11. A plastic housing cover for a valve as defined by claim 9, further wherein said means that overlap an outer portion of said connector sleeve and said metal nipple to secure said metal nipple to said connector sleeve is a separate member that is secured to said nipple by welding or soldering.

12. A plastic housing cover for a valve as defined by claim 11, further wherein said means that is secured to said nipple by welding or soldering further comprises a cylindrical rolled metal sheet.

* * * * *

UNITED STATES PATENT AND TRADEMARK OFFICE
CERTIFICATE OF CORRECTION

PATENT NO. : 4,917,407
DATED : April 17, 1990
INVENTOR(S) : Heiner Gassmann et al It is certified that error appears in the above-identified patent and that said Letters Patent is hereby corrected as shown below:

On the title page Item

[73] Assignee: Robert Bosch GmbH
Stuttgart, Fed. Rep. of Germany

Signed and Sealed this

Twenty-fourth Day of September, 1991

Attest:

HARRY F. MANBECK, JR.

Attesting Officer

Commissioner of Patents and Trademarks